United States Patent

[11] 3,570,721

[72] Inventor Robert H. Cushman
Princeton, N.J.
[21] Appl. No. 832,384
[22] Filed June 11, 1969
[45] Patented Mar. 16, 1971
[73] Assignee Western Electric Company, Incorporated
New York, N.Y.

[54] METHOD FOR EJECTING CONTROLLABLE AMOUNTS OF LIQUID FROM A CONTAINER
4 Claims, 4 Drawing Figs.

[52] U.S. Cl. ........ 222/319, 222/500
[51] Int. Cl. ........ B65d 5/72
[50] Field of Search ........ 222/160, 162, 319, 351, 352, 357, 360, 382, 500

[56] References Cited

UNITED STATES PATENTS 2,555,532 6/1951 Chinchole ........ 222/162X
3,481,514 12/1969 Theobald ........ 222/500

*Primary Examiner*—M. Henson Wood, Jr.
*Assistant Examiner*—Edwin D. Grant
*Attorneys*—H. J. Winegar, R. P. Miller and W. M. Kain

ABSTRACT: An instantaneous impact force is imparted to the outside of an otherwise closed, nondeformable chamber filled with a liquid and having an opening therein. The force generates a shock within the chamber which creates a two-cycle internal pressure that imparts motion to the liquid to cause a volume of the liquid proportional to the force to flow outwardly through the opening.

INVENTOR
R. H. CUSHMAN
By [signature]
ATTORNEY

METHOD FOR EJECTING CONTROLLABLE AMOUNTS OF LIQUID FROM A CONTAINER

BACKGROUND OF THE INVENTION

1. Field of the Invention

This invention relates to a method for facilitating and controlling the flow of a liquid outwardly through an opening in a chamber, and is particularly concerned with ejecting metered amounts of molten solder outwardly through one or a plurality of openings in a chamber onto matched bonding regions of an electrical component.

2. Problems in the Art of Prior Art

In the fabrication of complex electrical components, i.e., thin film resistors and the like, there are frequently many unavoidable apertures and grooves on the surface of these components which are situated near areas where terminals are to be located. Leads must be connected to these terminals, and generally, the leads are bonded by a separate soldering process. The amount of solder applied to these terminals must be sufficient to adequately effect the desired solder bond without overflowing into the aforementioned adjacent apertures and grooves of the component. Any such overflow will deleteriously effect the electrical properties of the component, and in fact, generally will result in a defective article. In the aforedescribed components, these lead terminals are extremely small; thus it has become increasingly more important to supply small, yet precise, quantities of solder to bond sites occupied by the terminals.

Presently used methods of applying precise amounts of molten solder directly to a bonding region of an electrical component have encountered only limited success. One typical method for applying molten solder directly to a bonding region entails the use of an enclosed solder-containing chamber having an extended channel therein. A protruding nozzle is affixed to the chamber and has an extended opening that communicates with the channel of the chamber; the chamber is filled up to the opening with molten solder. The opening is so designed so as to permit molten solder from the chamber to flow therethrough in globular form under the forces of capillary attraction.

In this technique, the nozzle is positioned adjacent a bonding region on an electrical component to be soldered, and the capillary attraction of the molten solder in the opening of the nozzle to the bonding region normally produces a successive flow of globules of molten solder onto the bonding region. The flow generally is controlled by controlling the diameter of the opening in the nozzle and the duration over which the nozzle is applied to the bonding region. To simultaneously bond a plurality of bonding regions, a plurality of nozzles, designed to match adjacent bonding regions of the component, are affixed to the chamber and have extended openings that communicate with the extended channel of the chamber.

The disadvantages of this technique are two-fold. Firstly, in order to control the amount of solder applied, the diameter of the opening in the nozzle and the duration of capillary contact of the nozzle and the bonding region are critical factors. It is found, when soldering miniature bond regions such as those located on microelectric components, that even with the smallest opening in the nozzle which permits normal capillary flow (i.e., unimpeded flow which starts and continues solely due to the capillary attraction of the molten solder to the bonding region,) an excess amount of solder may be deposited on the bonding region. On the other hand, when the openings in the nozzle are made sufficiently small so that flow occurring from normal capillary attraction will be prevented, an additional, internally imparted compressive force applied directly against the molten solder (as with a piston movable inside the chamber) is required to create flow. Unfortunately, the resistance of the molten solder to normal capillary flow when such additional force is applied is extremely high as a result of the high surface tension properties which the molten solder possesses. Therefore, the solder will not flow normally unless the additional force is very high. Moreover, even when this surface tension is overcome by the application of such high forces to the solder, it is very difficult to remove the force quickly enough to allow a resultant flow of a sufficiently small volume of molten solder through the opening to do a satisfactory bonding job. Thus, an excessive flow of the molten solder onto the bonding region may again take place within a fraction of a second before the high force can be removed. Thus, the same problem would exist. Consequently, control over the duration of application of the solder would, at the very best, be crude and approximate when employing this conventional technique.

This problem is further complicated when using the simultaneous bonding technique wherein a plurality of nozzles are applied to matching bonding surfaces. It is found in such cases that the surface tension of the molten solder normally varies from opening to opening, albeit the openings are generally identical in diameter. As a result, applying precise amounts of solder simultaneously to a plurality of bonding regions presents more complex problems than the application of solder to one bonding region.

SUMMARY OF THE INVENTION

An object of the present invention is to provide a new and improved method for controlling the flow of amounts of liquid stored in a chamber outwardly through a chamber opening designed to prevent free flow.

Another object is to provide a new and improved method for metering precise amounts of molten solder directly from an opening in a chamber to a corresponding bonding region of a workpiece.

A further object is to provide a new and improved method for ejecting identical, precise metered amounts of molten solder outwardly through a plurality of like openings of an otherwise closed nondeformable chamber to fill a plurality of matching, spaced bonding regions of a workpiece.

These and other objects are obtained by the technique of the present invention, which is described solely in connection with molten solder although it will be understood that any other liquid will be suitable. It has been discovered that if an instantaneous impact force is imparted to the outside of a rigid, nondeformable apertured chamber containing molten solder, and if such force is adjusted in magnitude to produce an initial shock-generated internal pressure higher by a predetermined amount than the threshold pressure required to overcome the surface tension of the contained molten solder at one or more chamber openings, the solder will not only be propelled through each opening of the chamber but the resultant volume of flow of the solder through each opening will be proportional to the magnitude of the impact force. (The chamber openings are assumed to be of such size that under normal conditions, surface tension will prevent the free flow of solder therethrough.) The propelling force for the solder when the impact force is applied is not due to the initial impulse of pressure caused by the impact, although such impact breaks the surface tension; but instead to the trailing edge of such pressure transient after the surface tension has been overcome. (For purposes of the following description, the initial impulse of pressure and the subsequent trailing edge, while constituting portions of a single continuous phenomenon, will hereafter be separately referred to as the "initial pressure" and the " followup pressure," respectively.) The followup pressure, like the initial pressure, is proportional to the impact force; the total duration of the two successive pressures is only a fraction of a second. Employing this discovery, a predetermined impact force can be imparted to the outside of the chamber to produce a correspondingly predetermined volume flow of solder through each opening in the chamber without deforming the chamber. Since solder flow will not begin until the start of the followup pressure, and since the followup pressure is much lower than the initial pressure, the problem of excess flow is avoided.

The above-mentioned predetermined amount of initial pressure above the threshold is necessary because merely overcoming the surface tension of the contained molten solder will not necessarily produce a followup internal pressure sufficient to cause the solder to flow outwardly through each opening in the chamber.

In one illustrative form of the invention, the above technique is employed to meter precise amounts of solder to a bonding region of a microelectric component. The bonding region of the component is positioned adjacent an opening of a rigid chamber filled with molten solder, and an instantaneous blow of a predetermined magnitude is imparted to the outside of the chamber. The force of the blow is predetermined so as to produce a known initial pressure sufficiently high to both overcome the surface tension of the solder within the opening of the chamber and to produce a known followup pressure of a magnitude sufficient to permit solder flow sufficient only to fill the bonding region of the component.

In a second illustrative form of the invention, a plurality of identical bonding regions of a component are simultaneously soldered employing this technique. A chamber having a plurality of like openings designed to match the plurality of identical bonding regions is filled with molten solder and positioned so that the plurality of openings are individually adjacent the respective plurality of bonding regions. Since the surface tension of the molten solder at each of the plurality of openings normally varies to some degree, an instantaneous impact blow of a predetermined magnitude sufficient to overcome the maximum surface tension is imparted to the outside of the chamber. The force of the blow is such that the followup pressure at each opening will be of a magnitude to allow identical predetermined volumes of molten solder to flow outwardly from the plurality of the openings onto the matching plurality of bonding regions on the component, with such volumes being sufficient to fill only the bonding regions.

DESCRIPTION OF THE DRAWING

The aforementioned and other objects and features of the invention will become apparent from the following detailed description of specific embodiments thereof, when read in conjunction with the accompanying drawing, in which.

DETAILED DESCRIPTION

Figure 1:
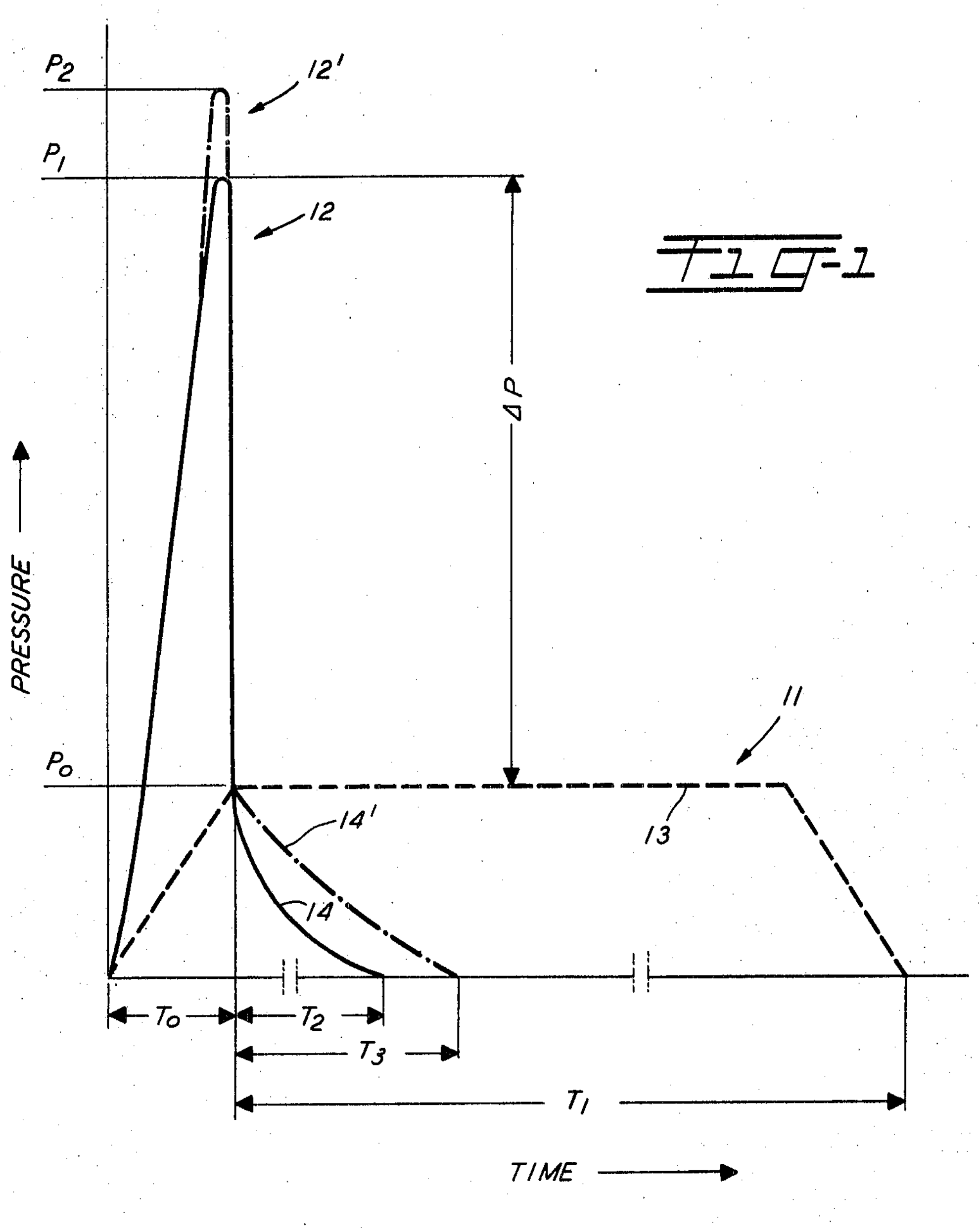
FIG. 1 is a graph illustrating the comparison, as a function of time, between typical pressures created in a closed solder-filled chamber by the externally imparted shock force of the present invention and those created by the internally imparted compressive force used in the prior art.

The graph in FIG. 1 illustrates in general the theoretical concept of the present invention and compares this concept with the conventional concept heretofore employed. The dotted curve 11 depicts the internal pressure characteristic produced, e.g., when a conventional compressive force is directly applied (as with a piston) to the interior of an otherwise enclosed, apertured, nondeformable chamber (not shown) as of steel, filled with molten solder. The force is of a magnitude to produce, within a negligible time interval $T_o$, an initial internal pressure $P_o$ (hereafter sometimes called "threshold pressure") which is assumed to be just sufficient to overcome the highest surface tension of the molten solder at any of the openings in the chamber. By comparison, the solid curve 12 depicts the internal pressure characteristic produced, e.g., when a momentary impact force is applied to the outside of the chamber in accordance with the invention. The initial internal pressure $P_1$ instantaneously produced by this impact force is greater, by an amount $\Delta P$, than the pressure $P_o$ required to overcome the highest surface tension of the molten solder at any of the openings in the chamber.

In the prior-art scheme represented by the curve 11, the initial pressure $P_o$ produced by the compressive force is an inertia-type pressure which defines a region 13 of the characteristic for a significant duration $T_1$ before abating to a negligible value (illustratively zero). On the other hand, the initial pressure $P_1$ produced by the impact force is a shock-generated pressure which has no inertia effect; thus, the initial pressure drops immediately. However, it has been discovered that if $\Delta P$ is sufficiently high in magnitude, the initial pressure will not abate to a negligible value. Instead, as soon as the initial pressure drops from $P_1$ to the threshold value $P_o$, a lower followup pressure is produced that defines a region 14 of the characteristic 12 over a duration $T_2$ before abating to a negligible value. The followup pressure is therefore an inertia-type pressure.

In the prior art, the pressure region 13 produces a flow of the molten solder outwardly through the openings in the chamber for the duration $T_1$. On the other hand, the followup pressure region 14 resulting from the impact force of the present invention is responsible for such flow, which will occur only over the duration $T_2$.

Obviously, the magnitude of the respective pressure regions 13 and 14 and their durations of application will govern the volume of molten solder flowing through the openings in the chamber. In general, the magnitude and duration of the pressure region 14 is much smaller than the magnitude and duration of the pressure region 13, and therefore more easily controllable amounts of molten solder will flow from the chamber when the concept of the present invention is employed, despite the fact that the initial pressure $P_1$ using the inventive technique is much greater than the threshold pressure $P_o$.

With this technique, then, impact forces which are much higher in magnitude than that required to overcome the maximum surface tension of the molten solder will produce a followup pressure sufficiently low to allow identical small volumes of molten solder to flow through each opening. Because of this, the inventive technique solves the problem of overcoming varying magnitudes of surface tensions of the molten solder within the various openings of the chamber without causing excess flow of solder. In addition, it has been discovered that with the inventive technique, varying the initial pressure by varying the impact force will produce varying flow proportional thereto. For example, as shown by the dash-dot curve 12′ of FIG. 1 a pressure $P_2$ produced by an impact force higher than the force which produced $P_1$ will also produce a followup region 14′ of duration $T_3$ which is of greater duration than $T_2$ and proportional to the impact force. Thus, by predetermining the desired volume of flow of the molten solder, the impact force required to produce the followup pressure can be determined.

Figure 2:
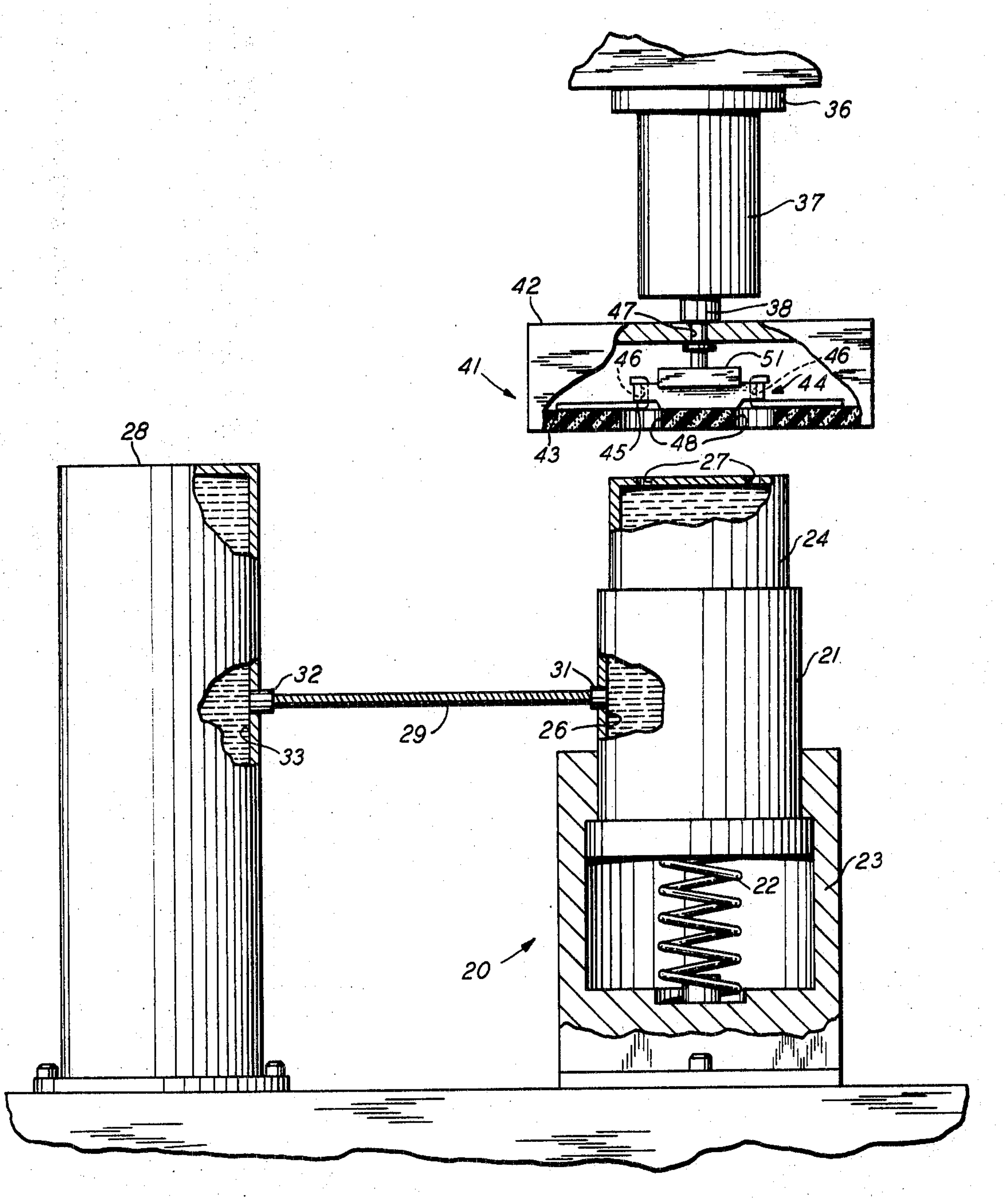
FIG. 2 is a schematic elevation view illustrating one form of apparatus that may be employed to carry out the present invention.
Figure 3:
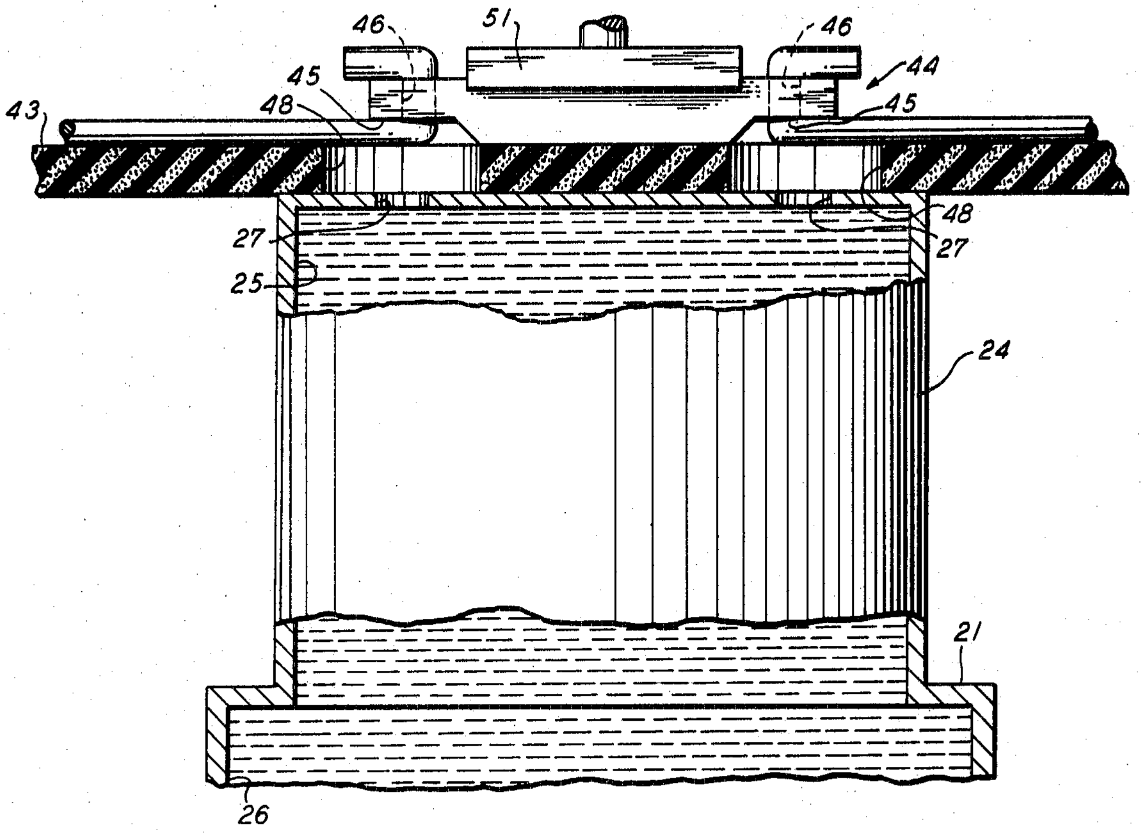
FIG. 3 is an enlarged view, partly in cross section, of part of the apparatus in FIG. 2, illustrating a nozzle of a solder chamber having openings therein in contact with protuberant bonding regions of a workpiece during a bonding operation employing the present invention.

Referring now to FIGS. 2 and 3, an illustrative form of apparatus employed to carry out the present invention is a soldering device 20 (FIG. 2) consisting of an enclosed rigid, nondeformable, molten solder chamber 21 which is resiliently mounted, as by a spring mechanism 22, to a suitable support 23. Projecting from the chamber 21 is a fixed, nondeformable soldering nozzle 24. As best seen in FIG. 3, the nozzle 24 has an extended channel 25 therein which communicates with a similar extended channel 26 located in the chamber 21. A plurality of openings 27–27 (of which only two are shown) are formed in the top of the nozzle and communicate with the extended channel 25.

As enclosed molten solder reservoir 28 (FIG. 2) is fixedly mounted for connection with the chamber 21 in the following manner. One end of a flexible conduit 29 is inserted so as to be tight-fitting within an opening 31 formed in the side of the chamber 21 and communicating with the extended channel 26 therein. The other end of the flexible conduit 29 is likewise inserted so as to be tight-fitting within an opening 32 formed in the side of the reservoir 28. The opening 32 likewise communicates with an extended channel 33 within the reservoir 28.

Figure 4:
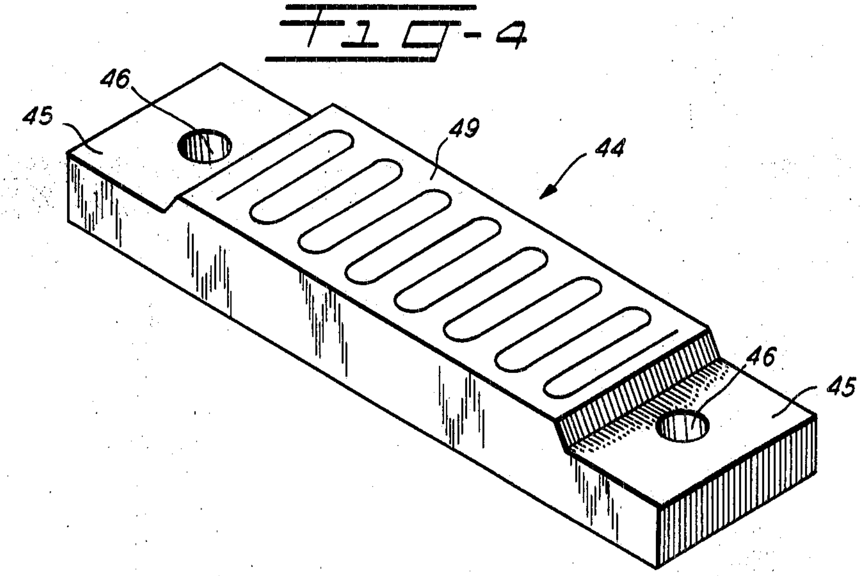
FIG. 4 is a blown-up perspective view of the workpiece of FIG. 3.

A pressure-actuated cylinder 36 having a vertical slidable piston 37 disposed therein is mounted so as to be aligned over the top of the nozzle 24 of the chamber 21. Affixed to the bottom of the piston is a centrally oriented necked-down work holder 38. A pallet box 41 having a closed top 42, and a resilient base 43 (e.g., of foam rubber) is employed to support a workpiece 44 to be soldered. The workpiece 44 is illustratively a thin film resistor (FIG. 4) having a bottom surface 45 in engagement with and overlying the base 43 (FIG. 3) of the pallet box. The surface 45 supports a plurality of bonding regions 46–46 defining the terminals thereof. Situated between the regions 46 is a conventional thin film resistor pattern 49 (FIG. 4). The top 42 (FIG. 2) of the pallet box 41 is provided with a central slot 47 for slidably receiving the necked-down workholder 38. A plurality of openings 48–48 are formed in the base 43 of the pallet box 41, each opening having a volume corresponding to the desired volume of solder to be deposited on the bonding regions 46. Each opening 48 is aligned over a corresponding one of a plurality of underlying openings 27–27 (FIG. 3) in the soldering nozzle 24. The workpiece 44 (FIG. 2) is positioned on the base 43 of the pallet box 41 so that each of the bonding regions 46–46 (FIG. 3) on the surface 45 of the workpiece is situated over each of the corresponding plurality of openings 48–48 in the base 43. A suitable clamping device 51 (FIG. 2) extends from the necked-down holder 38 and grips the workpiece 44 to firmly hold the workpiece in position on the base 43 of the pallet box 41.

In operation, the first step is to fill the channel 26 (FIG. 3) of the chamber 21 and the channel 25 of the affixed nozzle 24 with molten solder. This is conveniently accomplished by allowing the molten solder to pass from the opening 32 (FIG. 2) of the reservoir 28 through the conduit 29 into the opening 31 of the chamber 21. The molten solder in the reservoir 28 is maintained by means not shown, so as to always be at a level sufficiently above the top of the nozzle 24 to permit the free flow of the molten solder from the reservoir to the chamber 21 to precisely fill the chamber and the nozzle up to the openings 27 (FIG. 3). Next, the piston 37 (FIG. 2) having the aforementioned loaded pallet box 41 attached thereon is actuated to move vertically downward by imparting a predetermined force to the pressure cylinder 36. The force imparted is calculated so as to produce, upon instantaneous impact between the pallet box 41 and the top of the nozzle 24, successive initial and followup pressures required to eject exact and identical amounts of molten solder from openings 27–27 (FIG. 3) of the nozzle 24 in the manner generally described in connection with FIG. 1; the amount of ejected solder from each opening 27 (FIG. 3) is adjusted in this manner to be just sufficient to fill the volume of the associated opening 48 in the base 43. Thus, the molten solder ejected from each opening 27 upon impact forms a protuberant volume of solder upon the associated overlying bonding region 46 of the workpiece 44. As a result of the impact, chamber 21 (FIG. 2) is driven downward slightly due to the give of the resilient spring member 22. This downward movement of the chamber 21 flexes the conduit 29, which constricts the size of the opening in the conduit to a negligible diameter, thereby cutting off communication between the chamber 21 and the reservoir 28. This prevents any shock transferred to the reservoir 28 as a result of the impact to be retransmitted as a further force to the chamber 21. Upon subsequent retraction (i.e., upward movement) of the piston 37 of the pressure cylinder 36, the pallet box 41 containing the soldered workpiece 44 is raised from the nozzle 24. The spring 22 thereupon returns the chamber 21 to its original position and the conduit 29 returns to its original unconstricted shape. Communication between the reservoir 28 and the chamber 21 is thus reestablished, and molten solder is permitted to flow from the reservoir into the chamber to replenish the molten solder removed during the soldering operation. The workpiece 44 is then removed from the pallet box 41 and a new workpiece is assembled therein as aforedescribed.

While the invention has been described as being suitable for soldering a plurality of identical bonding regions, it will be obvious that a plurality of dissimilar bonding regions may be treated in like manner by making conventional adjustments without departing from the spirit and scope of the invention, as defined in the annexed claims.

I claim:

1. In a method for facilitating and controlling the flow of a liquid outwardly through an orifice of an otherwise closed nondeformable chamber, the chamber being normally completely filled with the liquid and selectively accessible to a replenishing source of the liquid, the steps comprising:

imparting a single momentary impact force of predetermined magnitude to the outside of the chamber to successively produce, in the interior of the chamber, an initial instantaneous pressure sufficient to overcome the surface tension of the liquid and a followup pressure lower than the initial pressure but sufficiently high to propel a predetermined quantity of the liquid outwardly through the orifice in the chamber, said quantity being proportional to the magnitude of the impact force; and then replenishing the chamber with the predetermined quantity of liquid removed during the imparting step.

2. In a method for ejecting metered amounts of molten solder outwardly through a plurality of like openings of an otherwise closed nondeformable chamber onto a plurality of matching bonding areas of a workpiece, the chamber being normally completely filled with the molten solder, the surface tension of the solder within the plurality of openings normally differing from opening to opening, the improvement which comprises:

imparting a single momentary impact force of predetermined magnitude to the outside of the chamber to successively produce, in the interior of the chamber, an initial instantaneous pressure sufficient to overcome the highest surface tension of the molten solder within any of the plurality of openings and a followup pressure sufficiently low to propel identical metered amounts of the molten solder through each of a plurality of openings onto each of the plurality of matching bonding areas, said amounts of solder propelled being proportional to the magnitude of said impact force.

3. In a method for ejecting metered amounts of molten solder through a plurality of openings of a soldering nozzle onto a plurality of matching bonding areas of a workpiece, the nozzle being normally completely filled with molten solder and selectively accessible to a replenishing source, the steps comprising:

positioning the nozzle and the workpiece so that each of the plurality of openings of the nozzle is in aligned relationship with a corresponding bonding area of the workpiece;

moving the nozzle and workpiece into contact with an instantaneous impact force of predetermined magnitude to successively produce, in the interior of the nozzle, an initial pressure greater than the pressure required to overcome the surface tension of the molten solder at any of the plurality of openings in the nozzle, and a followup pressure lower than the initial pressure but sufficiently high to propel a predetermined quantity of the molten solder through each of the openings of the nozzle onto the corresponding bonding area of the workpiece, said amount of solder propelled being proportional to the magnitude of said impact force; and replenishing the nozzle with the total quantity of molten solder removed during the moving step.

4. In a method for ejecting precise amounts of molten solder outwardly through an opening of an otherwise closed, nondeformable chamber to fill a protuberant bonding region on a surface of a workpiece, the steps comprising:

loading the workpiece in an apertured support in such a manner that the surface overlies a first support opening having a volume which defines the bonding region;

positioning the support so that the first opening is in an aligned, communicating relationship overlying the opening of the chamber;

filling the chamber with molten solder up to the level of the opening therein; and moving the chamber and the support into contact with an instantaneous impact force of predetermined magnitude to successively produce, within the opening of the chamber, an initial pressure greater than the pressure required to overcome surface tension of the molten solder at the opening, and a followup pressure lower than the initial pressure but sufficiently high to propel a predetermined quantity of the molten solder through the opening of the chamber and into the first opening of the support to completely and precisely fill said bonding region, said amount of solder propelled being proportional to the magnitude of said impact force.